US012693925B2

(12) United States Patent
Toms et al.

(10) Patent No.: US 12,693,925 B2
(45) Date of Patent: *Jul. 28, 2026

(54) REAL-TIME FAULT MANAGEMENT (RFM)

(71) Applicant: Level 3 Communications, LLC,
Denver, CO (US)

(72) Inventors: Steve Toms, Middleburg, FL (US);
Michael McClintock, Louisville, CO
(US); David Sutton, Monroe, LA (US);
Steven Burrell, Westminster, CO (US);
Shelley Goldner, Superior, CO (US);
Shelli L Hurd, Arvada, CO (US)

(73) Assignee: Level 3 Communications, LLC,
Denver, CO (US)

( * ) Notice: Subject to any disclaimer, the term of this
patent is extended or adjusted under 35
U.S.C. 154(b) by 38 days.

This patent is subject to a terminal dis-
claimer.

(21) Appl. No.: 18/910,785

(22) Filed: Oct. 9, 2024

(65) Prior Publication Data

US 2025/0028587 A1 Jan. 23, 2025

Related U.S. Application Data

(63) Continuation of application No. 17/987,316, filed on
Nov. 15, 2022, now Pat. No. 12,117,889.

(60) Provisional application No. 63/402,812, filed on Aug.
31, 2022.

(51) Int. Cl.
*G06F 11/07* (2006.01)
*H04L 41/06* (2022.01)

(52) U.S. Cl.
CPC ...... *G06F 11/0769* (2013.01); *G06F 11/0709*
(2013.01); *H04L 41/06* (2013.01); *G06F*
*2201/805* (2013.01)

(58) Field of Classification Search
CPC .. G06F 11/3082; G06F 11/0709; G06F 11/07;
G06F 11/0766; G06F 11/0769; G06F
11/0781; H04L 41/06
See application file for complete search history.

(56) References Cited

U.S. PATENT DOCUMENTS

| | | | |
|---|---|---|---|
| 11,924,019 B2 | 3/2024 | Krishnaswamy | |
| 2013/0086587 A1* | 4/2013 | Naik ................... | G06F 11/0781 |
| | | | 718/100 |
| 2015/0067408 A1* | 3/2015 | Jeon ....................... | G06F 9/542 |
| | | | 714/47.1 |

(Continued)

*Primary Examiner* — Yolanda L Wilson

(57) ABSTRACT

Novel tools and techniques are provided for implementing
real-time fault management or real-time fault management
system ("RFM"). In various embodiments, RFM may
receive alerts from or associated with network devices (e.g.,
layer 2, 3, and/or 4 devices, or the like) that are disposed in
a plurality of disparate networks that may utilize different
alert management protocols and/or different fault manage-
ment protocols. RFM may collect, enrich, normalize, aggre-
gate, and display the alerts in a user interface to facilitate
addressing of the alerts by a user. To enable continuous and
real-time functionality, RFM may be implemented in a
plurality of siloed platforms in a primary data center, with
processing of alerts being load balanced across the siloed
platforms, with mirrored group of siloed platforms in a
secondary data center located geographically distant from
the primary data center and configured to be on "hot
standby" and to completely take over RFM processing
operations.

17 Claims, 9 Drawing Sheets

(56) References Cited

U.S. PATENT DOCUMENTS

| 2017/0161166 | A1 | 6/2017 | Shivaprasad |
| 2019/0102469 | A1 | 4/2019 | Makovsky |
| 2022/0156275 | A1 | 5/2022 | Burke |
| 2024/0070005 | A1 | 2/2024 | Toms |
| 2024/0070009 | A1 | 2/2024 | Schoenfeldt |

* cited by examiner

400 ⟋

Ⓐ

400

400

500

REAL-TIME FAULT MANAGEMENT (RFM)

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network management, and, more particularly, to methods, systems, and apparatuses for implementing real-time fault management or real-time fault management system ("RFM").

BACKGROUND

Conventional network management systems are unable to handle all aspects of fault management. In the context of monitoring for faults, conventional network management systems only handle aspects of monitoring (e.g., only passive monitoring, only active polling, only pinging, and/or the like) network devices, but either do not utilize a broader suite of collection modalities and/or do not normalize alerts and/or do not enrich alerts with device, network, or other information, or the like, thereby resulting in incomplete information being presented to users or technicians, which prolongs resolution of network faults, requires further information gathering by the users or technicians, prolongs impact to the network and users or customers of network services, and so on.

Hence, there is a need for more robust and scalable solutions for implementing network management, and, more particularly, to methods, systems, and apparatuses for implementing real-time fault management or real-time fault management system ("RFM").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

DETAILED DESCRIPTION OF CERTAIN EMBODIMENTS

Overview

Figure 1:
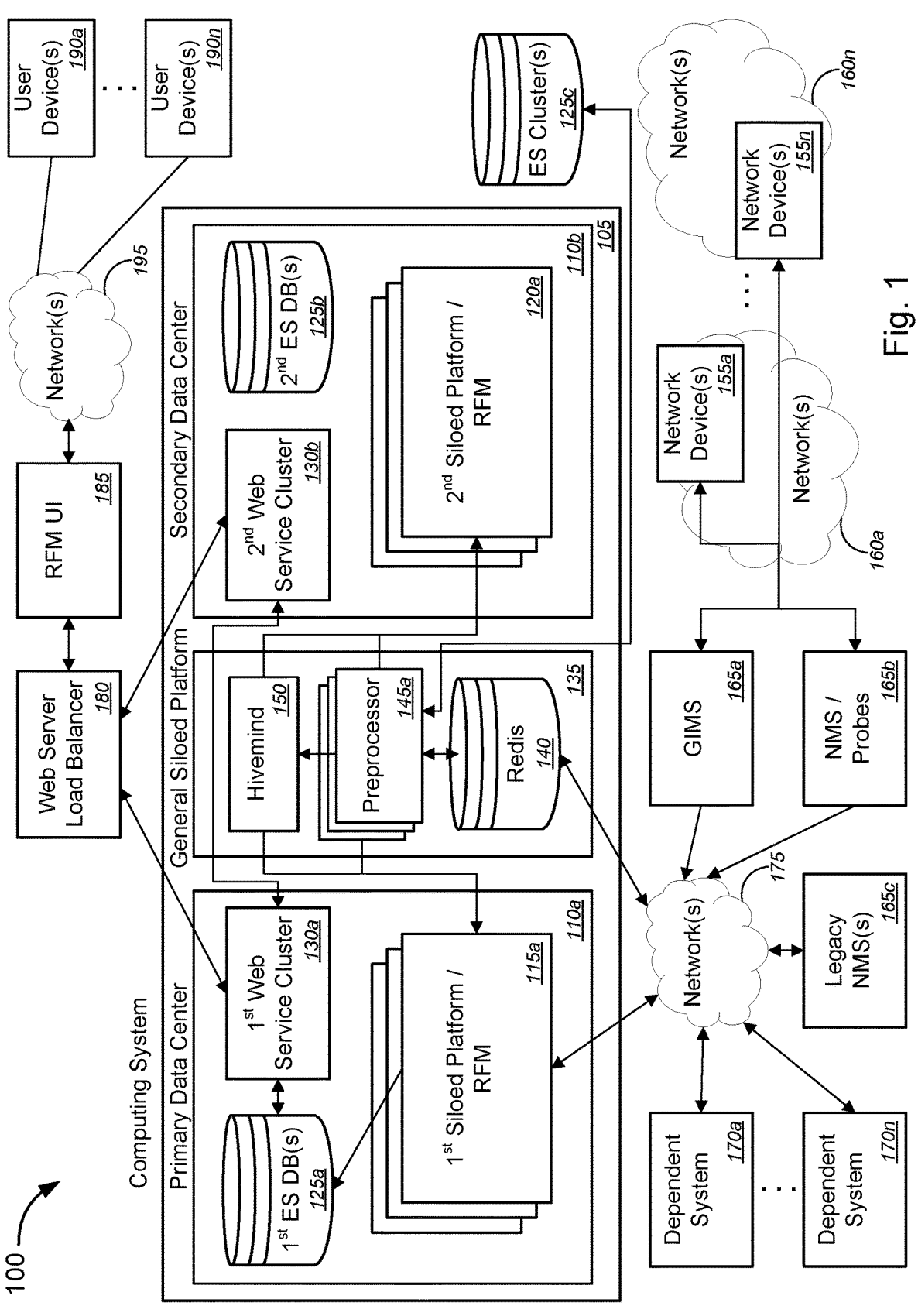
FIG. 1 is a schematic diagram illustrating a system for implementing real-time fault management or real-time fault management system ("RFM"), in accordance with various embodiments.

Various embodiments provide tools and techniques for implementing network management, and, more particularly, to methods, systems, and apparatuses for implementing real-time fault management or real-time fault management system ("RFM").

In various embodiments, RFM may receive alerts from or associated with network devices (e.g., layer 2, layer 3, and/or layer 4 devices, or the like) that are disposed in a plurality of disparate networks that may utilize different alert management protocols and/or different fault management protocols, or the like. RFM may collect, enrich, normalize, aggregate, and display the alerts in a user interface ("UI") to facilitate addressing of the alerts by a user. To enable continuous and real-time functionality, RFM may be implemented in a plurality of siloed platforms in a primary data center (with each siloed platform representing an autonomous unit or complete copy or instance of RFM), with processing of alerts being load balanced across the siloed platforms, with mirrored group of siloed platforms in a secondary data center located geographically distant from the primary data center. The mirrored group of siloed platforms is configured to be on "hot standby" and to completely take over RFM processing operations when the primary data center is experiencing at least one failure condition.

In some embodiments, a computing system (or the RFM) may receive a first alert associated with a first device among a plurality of network devices that is each disposed within at least one first network among a plurality of networks; based on a determination that the first alert is not a new alert associated with the first device and is an updated alert of a first previously received alert that is associated with the first device, and based on a determination that the first previously received alert is either in a first remote dictionary server ("Redis") queue ready for enrichment by an enrichment system of the RFM or being enriched by the enrichment system, may perform the following: holding, using a first clustered repository alert manager ("CRAM"), the first alert until the first previously received alert either has been enriched or has been placed in a second Redis queue for further processing by a CRAM; and after the first previously received alert has been enriched, placing, using the first CRAM, the first alert on the second Redis queue for the first CRAM or a second CRAM to update the first previously received alert with data from the first alert; may normalize the first alert relative to a plurality of alerts; and may display the first alert on a RFM UI to facilitate addressing of the first alert by the user.

These and other aspects of the RFM are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, using a computing system of a first real-time fault management system ("RFM"), a first alert associated with a first device among a plurality of network devices that is each disposed within at least one first network among a plurality of networks. The method may also comprise, based on a determination that the first alert is not a new alert associated with the first device and is an updated alert of a first previously received alert that is associated with the first device, and based on a determination that the first previously received alert is either in a first remote dictionary server ("Redis") queue ready for enrichment by an enrichment system of the first RFM or being enriched by the enrichment system, performing the following: holding, using a first clustered repository alert manager ("CRAM"), the first alert until the first previously received alert either has been enriched or has been placed in a second Redis queue for further processing by a CRAM; and after the first previously received alert has been enriched, placing, using the first CRAM, the first alert on the second Redis queue for the first CRAM or a second CRAM to update the first previously received alert with data from the first alert. The method may further comprise normalizing, using the computing system, the first alert relative to a plurality of alerts; and displaying, using the computing system, the first alert on a user interface ("UI") of the RFM ("RFM UI") to facilitate addressing of the first alert by the user.

In some embodiments, the computing system may comprise at least one of a network management system server, a fault management system, the first RFM, a plurality of RFMs, a network operations center ("NOC") computing system, a server over a network, a cloud computing system, or a distributed computing system, and/or the like. In some instances, the plurality of networks may comprise two or more disparate networks utilizing different alert management protocols and different fault management protocols.

According to some embodiments, the method may further comprise determining, using at least one of the computing system, the first CRAM, the second CRAM, or a first bundle processor each of the first RFM, whether the first alert is a new alert associated with the first device and whether the first alert has been assigned an identifier ("ID") comprising an alert ID and a source ID; and based on a determination that the first alert is a new alert associated with the first device and has not yet been assigned an ID comprising an alert ID and a source ID, performing the following: assigning, using the first CRAM, a first ID to the first alert, wherein the first ID comprises a combination of a first alert ID and a first source ID, wherein the first alert ID identifies the first alert and the first source ID identifies a source of the first alert based on device type of the source; and placing, using the first CRAM, the first alert in the first Redis queue for the enrichment system to enrich the first alert with first enrichment data.

In some cases, the method may further comprise performing, using the computing system and the enrichment system, enrichment of the first alert, by: pulling the first alert from the first Redis queue; retrieving the first enrichment data from one or more databases, based at least in part on one or more of data contained in the first alert or data contained in one or more alert profiles associated with the first alert; adding the first enrichment data to the first alert; and placing the enriched first alert in the second Redis queue for the first CRAM or the second CRAM to perform subsequent processing on the first alert. In some instances, the method may further comprise performing, using the computing system, alert correlation on the first alert to determine if and what relationships exist between the first alert and one or more other alerts among the plurality of alerts. In some cases, performing enrichment of the first alert may further comprise adding any determined relationships between the first alert and the one or more other alerts to the first alert. In some instances, the first enrichment data may comprise at least one of circuit ID, service ID, business organization ID, customer ID, other service data associated with a service provided via the first device to a customer, other customer data corresponding to the customer associated with the service provided via the first device or associated with the first device, device data associated with the first device, or network data associated with a network in which the first device is disposed, and/or the like.

In some embodiments, the method may further comprise determining, using at least one of the computing system, the first bundle processor, or a second bundle processor, whether a second alert that is received is a suppressed alert, based at least in part on data associated with the second alert, the second alert being associated with a second device among the plurality of network devices, wherein the data associated with the second alert may comprise at least one of device ID associated with the second device, service ID associated with a service provided via the second device to a customer, or alert ID associated with the second alert, and/or the like; identifying, using the first bundle processor or the second bundle processor, one or more alert profiles to which the second alert belongs; tagging, using the first bundle processor or the second bundle processor, the second alert with at least one of the identified one or more alert profiles or a profile ID corresponding to each of the identified one or more alert profiles, to form an updated second alert; and sending, using the first bundle processor or the second bundle processor, the updated second alert to an alert publisher that is disposed in the first RFM for sending to and storing in a search engine database that is disposed external to the first RFM, the alert publisher being configured to send alerts to the search engine database either one alert at a time or in batches of alerts for storage on the search engine database.

According to some embodiments, the first RFM is among a first plurality of RFMs disposed in a first data center, each RFM among the first plurality of RFMs comprising a siloed platform among a plurality of first siloed platforms. In some instances, each RFM among the first plurality of RFMs may comprise at least one of a Redis cluster containing the first and second Redis queues, the first CRAM, the second CRAM, the first bundle processor, a second bundle processor, the enrichment system, an alert publisher, a distributor, or a synchronization system, and/or the like. In some cases, the plurality of first siloed platforms may be mirrored in a plurality of second siloed platforms that is disposed in a second data center that is geographically distant from the first data center, the plurality of second siloed platforms comprising a second plurality of RFMs. In some instances, each RFM among the second plurality of RFMs may comprise a mirrored copy of each of the at least one of the Redis cluster, the first CRAM, the second CRAM, the first bundle processor, the second bundle processor, the enrichment system, the alert publisher, the distributor, or the synchronization system of a corresponding RFM among the first plurality of RFMs, and/or the like. In some cases, the distributor balances processes across the plurality of first siloed platforms, which is mirrored in the plurality of second siloed platforms. In some instances, the plurality of second siloed platforms may be on hot standby and may be configured to completely take over operations of the plurality of first siloed platforms when at least a portion of the first siloed platforms experiences at least one failure condition.

In some embodiments, at least one of the plurality of first siloed platforms or the plurality of second siloed platforms may be communicatively coupled with a general siloed platform disposed in a location separate from each of the first data center and the second data center. In some cases, the general siloed platform may comprise a third Redis queue, a plurality of preprocessors, and a second computing system. In some instances, the third Redis queue may be configured to store alerts received from each of at least one of a global Internet Protocol management system ("GIMS") configured to monitor and collect alerts from layer 2 and layer 3 devices, a plurality of software-based network probes configured to monitor layer 4 devices, or one or more legacy network management systems ("NMSs"), and/or the like. In some cases, each of the plurality of preprocessors may be configured to preprocess alerts retrieved from the third Redis queue and to store raw alert messages in search engine database cluster. In some instances, the second computing system may be configured to manage the plurality of preprocessors, to prevent more than one preprocessor from preprocessing the same alert from the third Redis queue, and to send preprocessed alerts to a siloed platform among the plurality of first siloed platforms, and/or the like. In some cases, receiving the first alert may comprise receiving the first alert from at least one of the second computing system, a preprocessor among the plurality of preprocessors, the GIMS, a software-based network probe among the plurality of software-based network probes, or a legacy NMS among the plurality of legacy NMSs, and/or the like.

According to some embodiments, the first RFM may be among a plurality of RFMs. In such cases, normalizing the first alert may comprise normalizing, using the computing system, the first alert relative to a plurality of alerts that are processed by the plurality of RFMs. In some instances, normalizing the first alert may further comprise conforming, using the computing system, at least one of formats and data fields of the plurality of alerts, or the like.

In some embodiments, the method may further comprise aggregating, using the computing system, two or more alerts among the plurality of alerts, the two or more alerts including the first alert, wherein displaying the first alert on the RFM UI may comprise displaying the aggregated two or more alerts on the RFM UI; and providing, using the computing system and within the RFM UI, the user with at least one of options to filter alerts based on one or more selected criteria, options to manage preferences for displaying alerts, options to modify one or more alert profiles for one or more alerts, options to adjust thresholds for tracking multiple related transient alerts, or options to search a search engine database, and/or the like. In some cases, when a query is received from a user device associated with a user as part of the user selecting the options to search the search engine database, the query may be routed to a web service cluster that is geographically closest to the user device, and the web service cluster may route the query to the search engine database, and the search engine database may return a response to the RFM UI via the web service cluster.

According to some embodiments, the method may further comprise determining, using at least one of the computing system or a scripting engine, whether one or more scripts should be generated or updated for the first alert, based at least in part on one or more first alert profiles associated with the first alert, the one or more scripts corresponding to rules for processing or handling the first alert; based on a determination that one or more scripts should be generated, generating, using the scripting engine, the one or more scripts, and tagging the first alert with the generated one or more scripts; and based on a determination that one or more scripts should be updated, updating, using the scripting engine, the one or more scripts, and tagging the first alert with the updated one or more scripts.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive a first alert associated with a first device among a plurality of network devices that is each disposed within at least one first network among a plurality of networks; based on a determination that the first alert is not a new alert associated with the first device and is an updated alert of a first previously received alert that is associated with the first device, and based on a determination that the first previously received alert is either in a first remote dictionary server ("Redis") queue ready for enrichment by an enrichment system of the RFM or being enriched by the enrichment system, perform the following: holding, using a first clustered repository alert manager ("CRAM"), the first alert until the first previously received alert either has been enriched or has been placed in a second Redis queue for further processing by a CRAM; and after the first previously received alert has been enriched, placing, using the first CRAM, the first alert on the second Redis queue for the first CRAM or a second CRAM to update the first previously received alert with data from the first alert; normalize the first alert relative to a plurality of alerts; and display the first alert on a user interface ("UI") of the RFM ("RFM UI") to facilitate addressing of the first alert by the user.

According to some embodiments, the computing system may comprise at least one of a network management system server, a fault management system, a plurality of RFMs, a first RFM among the plurality of RFMs, a network operations center ("NOC") computing system, a server over a network, a cloud computing system, or a distributed computing system, and/or the like.

In yet another aspect, a system may comprise a plurality of first siloed platforms disposed in a first data center, a plurality of second siloed platforms disposed in a second data center that is geographically distant from the first data center, and a general siloed platform disposed in a location separate from each of the first data center and the second data center. Each siloed platform of the plurality of first siloed platforms may correspond to a real-time fault management system ("RFM") among a first plurality of RFMs. In some instances, each RFM may comprise at least one of: one or more clustered repository alert managers ("CRAMs"), each CRAM being configured to perform at least one of processing of alerts, assigning identifiers to alerts, or holding alerts that are updates of previously received alerts that are waiting to be enriched or being enriched by an enrichment system until enrichment has been completed; the enrichment system configured to enrich alerts by retrieving enrichment data from one or more databases and adding the retrieved enrichment data to the alerts; a remote dictionary server ("Redis") cluster comprising a first Redis queue containing one or more alerts ready for enrichment by the enrichment system and a second Redis queue containing one or more alerts ready for one of the one or more CRAMs to perform subsequent processing; one or more bundle processors, each bundle processor being configured to perform at least one of identifying alert profiles to which each alert belongs and tagging the alerts with the identified alert profiles, or determining whether an alert has been suppressed and processing suppressed alerts based on one or more rules; at least one alert publisher configured to send alerts to a first external search engine database either one alert at a time or in batches of alerts for storage on the first external search engine database; a distributor configured to balance processes across the plurality of first siloed platforms; or at least one synchronization system configured to synchronize a mirrored copy of each of the at least one of the one or more CRAMs, the enrichment system, the Redis cluster, the one or more bundle processors, the at least one alert publisher, or the distributor in a corresponding RFM among a second plurality of RFMs corresponding to the plurality of second siloed platforms.

In some instances, the plurality of second siloed platforms may mirror the plurality of first siloed platforms, the plurality of second siloed platforms being on hot standby and being configured to completely take over operations of the plurality of first siloed platforms when at least a portion of the first siloed platforms experiences at least one failure condition.

In some cases, the general siloed platform may comprise: a third Redis queue, the third Redis queue being configured to store alerts received from each of at least one of a global Internet Protocol management system ("GIMS") configured to monitor and collect alerts from layer 2 and layer 3 devices, a plurality of software-based network probes configured to monitor layer 4 devices, or one or more legacy network management systems ("NMSs"); a plurality of preprocessors, each of the plurality of preprocessors being configured to preprocess alerts retrieved from the third Redis queue and to store raw alert messages in a search engine database cluster; and a computing system configured to manage the plurality of preprocessors, to prevent more than one preprocessor from preprocessing the same alert from the third Redis queue, and to send preprocessed alerts to a siloed platform among the plurality of first siloed platforms.

In some embodiments, the system may further comprise the first external search engine database, which is disposed in the first data center yet external to the plurality of first siloed platforms, the first external search engine database being configured to perform robust searches of data stored therein; a second external search engine database, which is disposed in the second data center yet external to the plurality of second siloed platforms, the second external search engine database being a mirrored copy of the first external search engine database; a first web service cluster that is disposed in the first data center yet external to the plurality of first siloed platforms, the first web service cluster being configured to handle queries from user devices that are geographically closest to it, to route queries from an RFM user interface ("UI") to the first external search engine database, and to route responses from the first external search engine database to the RFM UI; a second web service cluster that is disposed in the second data center yet external to the plurality of second siloed platforms, the second web service cluster being configured to handle queries from user devices that are geographically closest to it, to route queries from the RFM UI to the first external search engine database, and to route responses from the first external search engine database to the RFM UI; a web server load balancer configured to balance loads between the first web service cluster and the second web service cluster; and the RFM UI configured perform at least one of: displaying alerts to a user; aggregating two or more alerts among a plurality of alerts, and displaying the aggregated two or more alerts to the user; or providing the user with at least one of options to filter alerts based on one or more selected criteria, options to manage preferences for displaying alerts, options to modify one or more alert profiles for one or more alerts, options to adjust thresholds for tracking multiple related transient alerts, or options to search a search engine database. In some cases, alerts may be normalized prior to being displayed to the user on the RFM UI.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network management, and, more particularly, to methods, systems, and apparatuses for implementing real-time fault management or real-time fault management system ("RFM"), as referred to above. The methods, systems, and apparatuses illustrated by FIGS. 1-5 refer to examples of different embodiments that include various components and steps, which can be considered alternatives or which can be used in conjunction with one another in the various embodiments.

The description of the illustrated methods, systems, and apparatuses shown in FIGS. 1-5 is provided for purposes of illustration and should not be considered to limit the scope of the different embodiments.

Figure 2A:
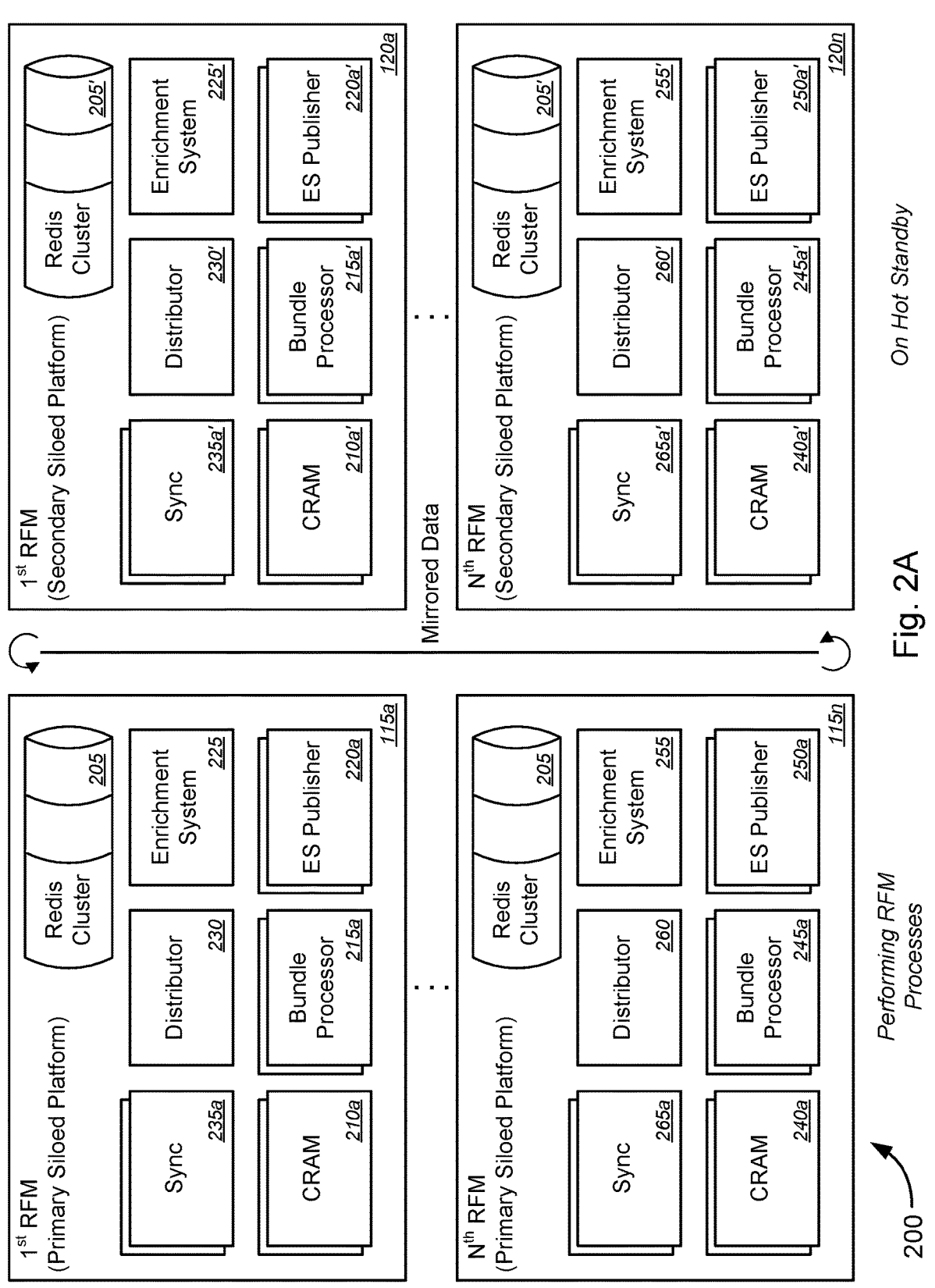
FIG. 2A is a schematic diagram illustrating a non-limiting example of mirrored primary and secondary siloed platforms that may be used when implementing RFM, in accordance with various embodiments.
Figure 2B:
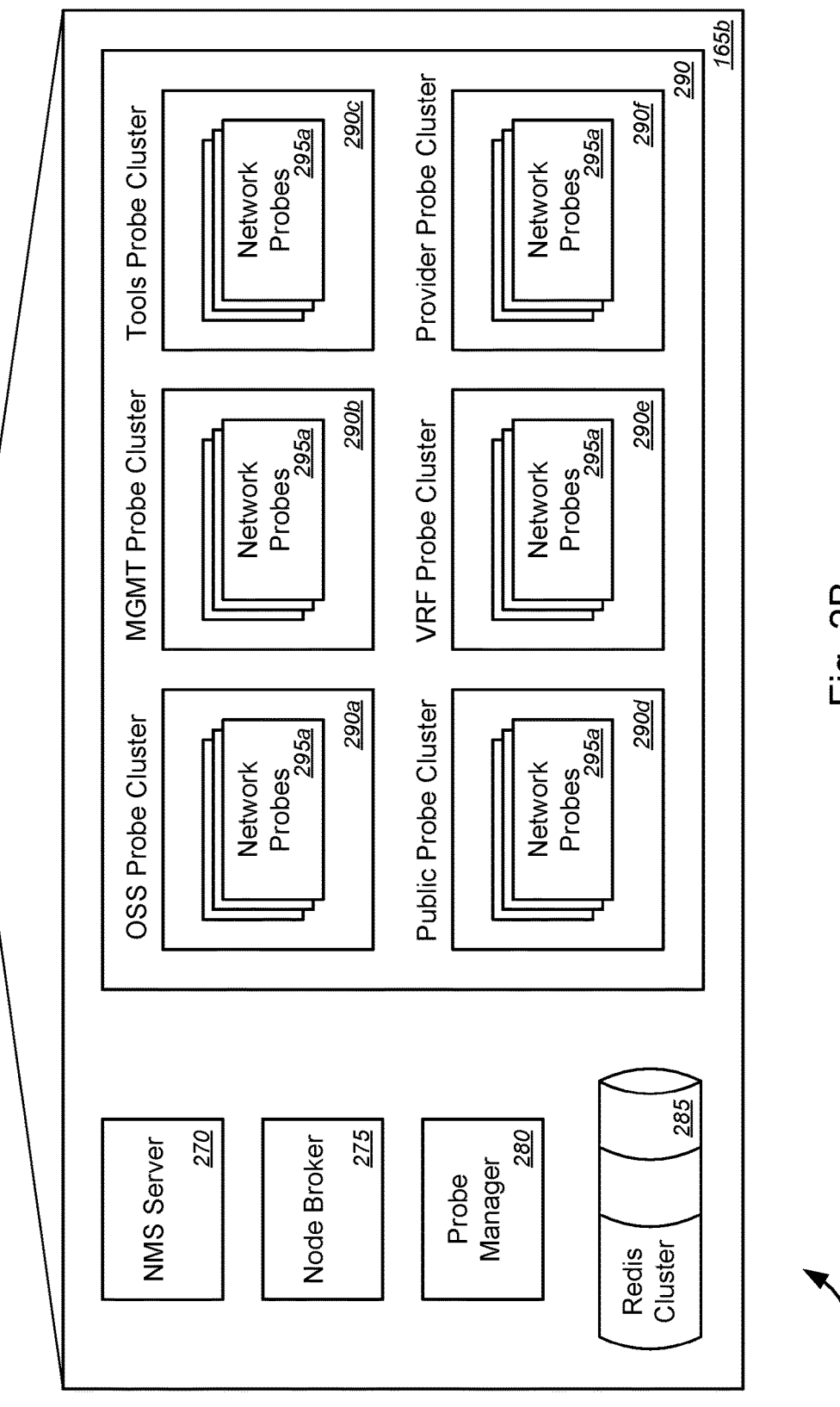
FIG. 2B is a schematic diagram illustrating a non-limiting example of network management system ("NMS") and probes in FIG. 1, in accordance with various embodiments.

With reference to the figures, FIG. 1 is a schematic diagram illustrating a system 100 for implementing RFM, in accordance with various embodiments. FIGS. 2A and 2B (collectively, "FIG. 2") are schematic diagrams illustrating non-limiting examples 200 of the primary and second siloed platforms of FIG. 1 (as shown in FIG. 2A) and the network management system ("NMS") and probes in FIG. 1 (as shown in FIG. 2B), in accordance with various embodiments. FIG. 2A is a schematic diagram illustrating a non-limiting example of mirrored primary and secondary siloed platforms that may be used when implementing RFM, in accordance with various embodiments, while FIG. 2B is a schematic diagram illustrating a non-limiting example of network management system ("NMS") and probes in FIG. 1, in accordance with various embodiments.

In the non-limiting embodiment of FIG. 1, system 100 may comprise a computing system 105, which may include a fault management system (e.g., RFM, or the like) that is configured to receive alerts for and/or from network devices (including, but not limited to, at least one of layer 2 devices, layer 3 devices, and/or layer 4 devices corresponding to open systems interconnection ("OSI") model's data link layer, network layer, and/or transport layer, respectively, or the like) that are disposed in one or more disparate networks, and to enrich, aggregate, and display the alerts on a user interface ("UI") of the fault management system (e.g., "RFM UI" or the like) to facilitate addressing of the alert(s) by a user(s). In some cases, the user(s) may include, without limitation, technicians who add or remove network devices and/or people who need access to such network devices, as listed or identified by network operations center ("NOC") managers, or the like.

In some embodiments, the computing system 105 may include, without limitation, a plurality of first siloed platforms 115a-115n (collectively, "first siloed platforms 115" or the like) disposed in a first or primary data center 110a, a plurality of second siloed platforms 120a-120n (collectively, "second siloed platforms 120" or the like) disposed in a second or secondary data center 110b that is geographically distant from the first or primary data center 110a, and a general siloed platform 135 disposed in a location separate from each of the first or primary data center 110a and the second or secondary data center 110b. The computing system 105 may further include, but is not limited to, a first external search engine database(s) or query cache(s) 125a and a first web service cluster 130a, each of which may be disposed in the primary data center 110a yet external to the plurality of first siloed platforms 115, and a second external search engine database(s) or query cache(s) 125b and a second web service cluster 130b, each of which may be disposed in the secondary data center 110b yet external to the plurality of second siloed platforms 120, or the like. In some cases, the first and second external search engine database(s) or query cache(s) 125a and 125b (collectively, "search engine database(s) 125," "search engine query cache(s) 125," "ES database(s) 125," "ES query cache(s) 125," or the like) may include, without limitation, database(s) or query cache(s) for an Elasticsearch® ("ES") search engine, or the like, that provides a distributed, multi-titenant-capable full-text search engine functionality and is configured to provide very fast searching (although not ideal for primary storage) and to perform robust searches of data stored therein. In some instances, the first and second web service clusters 130a and 130b configured to handle queries from user devices (e.g., user devices 190) that are geographically closest to it, to route queries from an RFM UI 185 to the first external search engine database 125a, and to route responses from the first external search engine database 125a to the RFM UI 185. The second external search engine database 125b would be mirrored and on "hot standby," similar to the rest of the plurality of siloed platforms 120a-120n (as described in detail below). In some instances, the computing system 105 may include (or further include), but is not limited to, at least one of a network management system server, a fault management system, the first RFM, a plurality of RFMs, a NOC computing system, a server over a network, a cloud computing system, or a distributed computing system, and/or the like. In some cases, the fault management system may include, without limitation, RFM 115a-115n or 120a-120n, which may be configured to display real-time or near-real-time consolidated alert data.

According to some embodiments, the system 100 may further comprise a web server load balancer 180, the RFM UI 185, one or more user devices 190a-190n (collectively, "user devices 190" or the like) associated with or used by one or more users (as described above), and one or more networks 195 that provide the user devices 190 with access to the RFM UI 185. In some cases, the web server load balancer 180 may be configured to balance loads between the first web service cluster 130a and the second web service cluster 130b. In some instances, the RFM UI 185 may be configured to perform at least one of: displaying alerts to a user; aggregating two or more alerts among a plurality of alerts, and displaying the aggregated two or more alerts to the user; or providing the user with at least one of options to filter alerts based on one or more selected criteria, options to manage preferences for displaying alerts, options to modify one or more alert profiles for one or more alerts, options to adjust thresholds for tracking multiple related transient alerts, or options to search a search engine database, and/or the like. In some cases, alerts may be normalized prior to being displayed to the user on the RFM UI. In some instances, the one or more user devices 190 may each include, but is limited to, one of a desktop computer, a laptop computer, a tablet computer, a smart phone, a mobile phone, a NOC computing system or console, or any suitable device capable of communicating with RFM UI 185) via a web-based portal, an application programming interface ("API"), a server, a software application ("app"), or any other suitable communications interface, or the like, over network(s) 195.

In some embodiments, each siloed platform of the plurality of first siloed platforms 115 may correspond to a real-time fault management system among a first plurality of RFMs. In some instances, with reference to FIG. 2A, each RFM may include, but is not limited to, at least one of: a remote dictionary server ("Redis") cluster 205, one or more clustered repository alert managers ("CRAMs") 210a-210n or 240a-240n (collectively, "CRAMs 210" or "CRAMs 240" or the like), one or more bundle processors 215a-215n or 245a-245n (collectively, "bundle processors 215" or "bundle processors 245" or the like), at least one alert publisher 220a-220n or 250a-250n (collectively, "alert publishers 220," "alert publishers 250," "ES publishers 220," or "ES publishers 250," or the like), an enrichment system 225 or 255, a distributor 230 or 260, or at least one synchronization system 235a-235n or 265a-265n (collectively, "synchronization systems 235" or "synchronization systems 265" or the like), and/or the like.

In some cases, the first Redis cluster 205 may include a first Redis queue containing one or more alerts ready for enrichment by the enrichment system and a second Redis queue containing one or more alerts ready for one of the one or more CRAMs to perform subsequent processing. In some embodiments, the Redis database or cluster 205 or 205' may be a non-relational (or "non-SQL" or "NoSQL") database that is also an in-memory data structure store that may be used as a distributed, in-memory key-value database, cache, and message broker, and supports different types of abstract data structures, including, but not limited to, at least one of strings, lists, maps, sets, sorted sets, HyperLogLogs, bitmaps, streams, or spatial indices, and/or the like. In the various embodiments, the Redis database or cluster 205 or 205' may be used as one or more Redis queues. In some instances, the Redis database or cluster 205 (or 205') may be shared amongst the plurality of first siloed platforms 115 (or the plurality of second siloed platforms 120) and may be configured to serve as a shared "scratch pad" or "shared queue," or the like. In some cases, data is input into Redis queues in the Redis cluster 205 (or 205') and devices or components retrieve the data from the queues (e.g., in a pull architecture, as compared, e.g., we a publication/subscription ("pub/sub") architecture. The Redis database or cluster 205 or 205' provides for very fast and very good transactional storage functionalities (although not ideal for searching operations).

In some instances, each CRAM 210 or 240 may be configured to perform at least one of processing of alerts, assigning identifiers to alerts, or holding alerts that are updates of previously received alerts that are waiting to be enriched or being enriched by the enrichment system until enrichment has been completed, and/or the like. In some cases, each bundle processor 215 or 245 may be configured to perform at least one of identifying alert profiles to which each alert belongs and tagging the alerts with the identified alert profiles, or determining whether an alert has been suppressed and processing suppressed alerts based on one or more rules, and/or the like. In some instances, the at least one alert publisher 220 or 250 may be configured to send alerts to a first external search engine database (e.g., external search engine database(s) 125a, or the like) either one alert at a time or in batches of alerts (e.g., in batches of 1500 alerts or 5 seconds worth of alerts, or more, etc.) for storage on the first external search engine database. In some cases, the enrichment system 225 or 255 may be configured to enrich alerts by retrieving enrichment data from one or more databases (not shown) and adding the retrieved enrichment data to the alerts. In some instances, the distributor 230 or 260 may be configured to balance processes across the plurality of first siloed platforms 115.

Merely by way of example, in some embodiments, multiple instances of CRAM, multiple instances of the bundle processor, and the enrichment worker may work together to process an incoming alert. For instance, when an alert arrives in the CRAM's intake queue, one instance of CRAM (of several that are running in parallel) may pick the alert off the queue and may determine that this is the first time that this alert has been received. If so, this instance of CRAM may send the alert to the enrichment system to be enriched, by pushing the alert to the enrichment system's queue. The instance of CRAM may then put a hold on any further updates for that particular alert until the enrichment process has been completed. If any other updates to that alert do arrive, all of the instances of CRAM know that it is on hold pending completion of the enrichment process, and one or more of the instances of CRAM may put the update(s) to the alert in a special queue just for that alert. Once the enrichment system (or enrichment worker) has completed its task of enriching the alert, it may send the alert back to the CRAM on an "enrichment complete" queue (as opposed to its usual intake queue). An instance of CRAM (not necessarily the same one that first received the alert and pushed it onto the enrichment system's queue) may pick the enriched alert off the enrichment complete queue and perform the following tasks: (i) finish processing that alert, and storing that alert in a Redis transaction cache; (ii) checking that special queue for the alert to see if there are any held updates, and, if so, processing the those updates in the order that they arrived; and (iii) assigning an ID to the alert if it does not already have one and taking any previously stored data for that alert and merging it with the new data for the updated alert (in the case that it is a new alert or a first instance of the alert, there is no stored data), and overwriting the alert that is stored in the Redis transaction cache with the latest (merged) version. Once the alert has been stored in the Redis transaction cache, it is sent to the bundle processors' intake queue, from which an instance among the multiple instances of the bundle processor may pick an alert and process before repeating such steps. Each instance of the bundle processor may determine whether the alert should be suppressed, and may mark the alert with the suppression IDs of any matching user-defined suppression for which it matches the suppression criteria. Each instance of the bundle processor may also determine to which profiles the alert belongs based on all of the different profiles' filters, bundles, and expressions, and may mark the alert with the specific profiles it matches. The instance of the bundle processor may then send the updated alert with its suppressions and profiles tagged on it to the searched cache for the user interface, in some cases, through the ES publisher, or the like. This workflow is provided as a non-limiting example of processes that may be performed in accordance with the various embodiments.

In some cases, the at least one synchronization system 235 or 265 may be configured to synchronize a mirrored copy of each of the at least one of the one or more CRAMs 210 or 240, the enrichment system 225 or 255, the Redis cluster 205, the one or more bundle processors 215 or 245, the at least one alert publisher 220 or 250, the distributor 230 or 260, or synchronization systems 235 or 265, and/or the like, in corresponding components (i.e., at least one of the one or more CRAMs 210' or 240', the enrichment system 225' or 255', the Redis cluster 205', the one or more bundle processors 215' or 245', the at least one alert publisher 220' or 250', the distributor 230' or 260', or synchronization systems 235' or 265', and/or the like, respectively) in a corresponding RFM among a second plurality of RFMs corresponding to the plurality of second siloed platforms.

In some instances, the plurality of second siloed platforms 120a-120n may mirror the plurality of first siloed platforms 115a-115n (as depicted in FIG. 2A by the line denoted, "Mirrored Data," or the like), the plurality of second siloed platforms 120a-120n being "on hot standby" and being configured to completely take over operations of the plurality of first siloed platforms, which is "performing RFM processes," when at least a portion of the first siloed platforms experiences at least one failure condition (including, but not limited to, at least one of network components of the primary data center being down, physical faults in the primary data center, software-based faults in the primary data center, and/or the like).

Turning back to FIG. 1, in some instances, the general siloed platform 135 may include, but is not limited to, a third Redis cluster or queue 140, a plurality of preprocessors 145a-145n (collectively, "preprocessors 145" or the like), and a computing system or hivemind 150, and/or the like, each of which enables parallel processing, or the like. In some cases, the third Redis cluster or queue 140 may be configured to store alerts received, in some instances, via network(s) 175, from each of at least one of a global Internet Protocol management system ("GIMS") 165*a* configured to monitor and collect alerts from layer 2 and layer 3 devices; a network management system ("NMS") and a plurality of software-based network probes 165*b* (collectively, "NMS and Probes 165*b*" or the like) configured to monitor layer 4 devices; one or more legacy NMSs 165*c*; or one or more dependent systems 170*a*-170*n* (collectively, "dependent systems 170" or the like); and/or the like. GIMS 165*a* is described in greater detail in U.S. patent application Ser. No. 18/358,756, filed Jul. 26, 2023, by Steve Toms et al., entitled, "Global Internet Protocol Management System (GIMS) for Monitoring Network Devices for Fault Management," which claims priority to U.S. Patent Application Ser. No. 63/410,733 (the "'733 Application"), filed Sep. 28, 2022, by Steve Toms et al., entitled, "Global Internet Protocol Management System (GIMS) for Monitoring Network Devices for Fault Management," and U.S. Patent Application Ser. No. 63/410,749 (the "'749 Application"), filed Sep. 28, 2022, by Steve Toms et al., entitled, "Software-Based Network Probes for Monitoring Network Devices for Fault Management," the disclosure of each of which is incorporated herein by reference in its entirety for all purposes.

Referring to FIG. 2B, NMS and Probes 165*b* may include, without limitation, at least one of NMS server 270, node broker 275, probe manager 280, Redis cluster 285, and a plurality of probe clusters 290*a*-290*f* (collectively, "probe clusters 290" or the like), each probe cluster including a plurality of network probes 295*a*-295*n* (collectively, "network probes 295" or the like). In some instances, the plurality of probe clusters 290 may include, without limitation, at least one of one or more operational support systems ("OSS") probe clusters 290*a*, one or more management ("MGMT") probe clusters 290*b*, one or more network tools probe clusters 290*c*, one or more public network probe clusters 290*d*, one or more virtual routing and forwarding ("VRF") probe clusters 290*e*, or one or more network service provider probe clusters 290*f*, and/or the like. In some cases, the plurality of network probes 295 may include, but is not limited to, a plurality of software-based network probes that are configured to passively and/or actively collect alerts or alert data, or the like. NMS and Probes 165*b* (and their components) are described in greater detail in U.S. patent application Ser. No. 18/358,771, filed Jul. 26, 2023, by Steve Toms et al., entitled, "Software-Based Network Probes for Monitoring Network Devices for Fault Management," which claims priority to '733 and '749 Applications, the disclosure of each of which has already been incorporated herein by reference in its entirety for all purposes.

Turning back to FIG. 1, in some cases, the dependent systems 170 may include, without limitation, one or more of an intelligent alert automation system ("IAA"), a dashboard for alert storage and history ("DASH"), a provisional tool, a chat bot, a customer alert processor, or other dependent systems, and/or the like. In some instances, the dependent systems 170 may communicatively couple with the general siloed platform 135 (and/or the Redis cluster or queue 140, or the like) via application programming interfaces ("APIs") or the like. IAA is described in greater detail in U.S. patent application Ser. No. 17/961,858, filed Oct. 7, 2022, by Kevin Schneider et al., entitled, "Intelligent Alert Automation (IAA)," which claims priority to U.S. Patent Application Ser. No. 63/402,814 (the "'814 Application"), filed Aug. 31, 2022, by Kevin Schneider et al., entitled, "Intelligent Alert Automation (IAA)," the disclosure of each of which is incorporated herein by reference in its entirety for all purposes. DASH is described in greater detail in U.S. patent application Ser. No. 17/961,867, filed Oct. 7, 2022, by Matthew D. Schoenfeldt et al., 2022, by Matthew D. Schoenfeldt et al., entitled, "Dashboard for Alert Storage and History (DASH)," which claims priority to U.S. Patent Application Ser. No. 63/402,821 (the "'821 Application"), filed Aug. 31, 2022, by Matthew D. Schoenfeldt et al., entitled, "Dashboard for Alert Storage and History (DASH)," the disclosure of each of which is incorporated herein by reference in its entirety for all purposes. The provisioning tool is described in greater detail in U.S. patent application Ser. No. 17/491,186 (the "'186 Application"), filed Sep. 30, 2021, by Jaime D. Lemley et al., entitled, "Provisioning Tool—Call Center-Based Automated Interface with Network Switches for Internet Service Diagnostics and Provisioning," which claims priority to U.S. Patent Application Ser. No. 63/227,224 (the "'224 Application"), filed Jul. 29, 2021, by Jaime Lemley et al., entitled, "Provisioning Tool—Call Center-Based Automated Interface with Network Switches for Internet Service Diagnostics and Provisioning," the disclosure of each of which is incorporated herein by reference in its entirety for all purposes.

In some instances, each of the plurality of preprocessors 145 may be configured to preprocess alerts retrieved from the third Redis queue and to store raw alert messages in a search engine database cluster 125*c* (which may or may not be disposed at the same location as the general siloed platform 135). In some cases, the computing system or hivemind 150 may be configured to manage the plurality of preprocessors, to prevent more than one preprocessor from preprocessing the same alert from the third Redis queue, and to send preprocessed alerts to a siloed platform among the plurality of first siloed platforms. In some embodiments, GIMS 165*a* and NMS and Probes 165*b* may monitor and collect alerts and alert data from one or more network devices 155*a*-155*n* (collectively, "network devices 155" or the like) that are located or disposed in the networks 160. In some cases, the plurality of networks 150 may include, but is not limited to, two or more disparate networks utilizing different alert management protocols and different fault management protocols. In some instances, the one or more network devices 155 may each include, without limitation, at least one of a layer 2 switch or network switch (e.g., an Ethernet switch or other media access control ("MAC") address-based network switch, or the like), a layer 2 network hub (e.g., an Ethernet hub or other MAC-based network switch, or the like), a bridge, a modem, a network card, an access point, a layer 3 switch or network switch (e.g., an Internet Protocol ("IP") address-based network switch, or the like), a router, a layer 4 switch, a gateway device, a network node, a gateway node, a firewall, an optical network switch and routing platform, a wavelength division multiplexing ("WDM")-based optical transport network system, or a network transmission system, and/or the like.

In some embodiments, network(s) 160, 175, and/or 195 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 160, 175, and/or 195 may include an access network of the service provider (e.g., an Internet service provider ("ISP")). In another embodiment, the network(s) 160, 175, and/or 195 may include a core network of the service provider and/or the Internet.

In operation, one or more of the computing system 105, the plurality of first siloed platforms or RFMs 115, the plurality of second siloed platforms or RFMs 120, or the general siloed platform 135, and/or the like (collectively, "computing system" or the like) may receive a first alert associated with a first device among a plurality of network devices that is each disposed within at least one first network among a plurality of networks. In some cases, receiving the first alert may comprise receiving the first alert from at least one of the second computing system, a preprocessor among the plurality of preprocessors, the GIMS, a software-based network probe among the plurality of software-based network probes, or a legacy NMS among the plurality of legacy NMSs, and/or the like.

Based on a determination that the first alert is not a new alert associated with the first device and is an updated alert of a first previously received alert that is associated with the first device, and based on a determination that the first previously received alert is either in a first Redis queue (e.g., in Redis cluster 205, or the like) ready for enrichment by an enrichment system (e.g., enrichment system 225 or 255, or the like) of the first RFM or being enriched by the enrichment system, the computing system may perform the following: holding, using a first CRAM (e.g., CRAM 210 or 240, or the like), the first alert until the first previously received alert either has been enriched or has been placed in a second Redis queue for further processing by a CRAM (e.g., CRAM 210 or 240, or the like); and after the first previously received alert has been enriched, placing, using the first CRAM, the first alert on the second Redis queue for the first CRAM or a second CRAM to update the first previously received alert with data from the first alert. The computing system may normalize the first alert relative to a plurality of alerts, and may display the first alert on a RFM UI (e.g., RFM UI 185, or the like) to facilitate addressing of the first alert by the user. In some cases, normalizing the first alert may comprise the computing system normalizing the first alert relative to a plurality of alerts that are processed by the plurality of RFMs. In some instances, normalizing the first alert may further comprise the computing system conforming at least one of formats and data fields of the plurality of alerts, or the like.

According to some embodiments, the computing system (in some cases, using at least one of the first CRAM, the second CRAM, or a first bundle processor each of the first RFM, or the like) may determine whether the first alert is a new alert associated with the first device and whether the first alert has been assigned an identifier ("ID") comprising an alert ID and a source ID. Based on a determination that the first alert is a new alert associated with the first device and has not yet been assigned an ID comprising an alert ID and a source ID, the computing system may perform the following: assigning, using the first CRAM, a first ID to the first alert, where the first ID comprises a combination of a first alert ID and a first source ID, where the first alert ID identifies the first alert and the first source ID identifies a source of the first alert based on device type of the source; and placing, using the first CRAM, the first alert in the first Redis queue for the enrichment system to enrich the first alert with first enrichment data.

In some cases, the computing system, using the enrichment system, may perform enrichment of the first alert, by: pulling the first alert from the first Redis queue; retrieving the first enrichment data from one or more databases, based at least in part on one or more of data contained in the first alert or data contained in one or more alert profiles associated with the first alert; adding the first enrichment data to the first alert; and placing the enriched first alert in the second Redis queue for the first CRAM or the second CRAM to perform subsequent processing on the first alert. In some instances, the computing system may perform alert correlation on the first alert to determine if and what relationships exist between the first alert and one or more other alerts among the plurality of alerts (e.g., the first alert is related to another alert in that one is from a parent circuit while the other from a child circuit, or each is from two circuits that are (directly or indirectly) connected or communicatively coupled together, or the like). In such cases, performing enrichment of the first alert may further comprise adding any determined relationships between the first alert and the one or more other alerts to the first alert. In some instances, the first enrichment data may include, without limitation, at least one of circuit ID, service ID, business organization ID, customer ID, other service data associated with a service provided via the first device to a customer, other customer data corresponding to the customer associated with the service provided via the first device or associated with the first device, device data associated with the first device, or network data associated with a network in which the first device is disposed, and/or the like.

In some embodiments, the computing system (in some cases, using at least one of the first bundle processor, or a second bundle processor, or the like) may determine whether a second alert that is received is a suppressed alert, based at least in part on data associated with the second alert, the second alert being associated with a second device among the plurality of network devices. In some cases, the data associated with the second alert may include, but is not limited to, at least one of device ID associated with the second device, service ID associated with a service provided via the second device to a customer, or alert ID associated with the second alert, and/or the like. The computing system, using the first bundle processor or the second bundle processor, may identify one or more alert profiles to which the second alert belongs; may tag the second alert with at least one of the identified one or more alert profiles or a profile ID corresponding to each of the identified one or more alert profiles, to form an updated second alert; and may send the updated second alert to an alert publisher (e.g., alert publisher or ES publisher 220 or 250, or the like) that is disposed in the first RFM for sending to and storing in a search engine database (e.g., search engine or ES database(s) 125a, or the like) that is disposed external to the first RFM.

According to some embodiments, the computing system may aggregate two or more alerts among the plurality of alerts, the two or more alerts including the first alert. In such cases, displaying the first alert on the RFM UI may comprise displaying the aggregated two or more alerts on the RFM UI. In some instances, the computing system may, within the RFM UI, provide the user with at least one of options to filter alerts based on one or more selected criteria, options to manage preferences for displaying alerts, options to modify one or more alert profiles for one or more alerts, options to adjust thresholds for tracking multiple related transient alerts, or options to search a search engine database, and/or the like. In some cases, when a query is received from a user device associated with a user as part of the user selecting the options to search the search engine database, the query may be routed to a web service cluster that is geographically closest to the user device, and the web service cluster may route the query to the search engine database, and the search engine database may return a response to the RFM UI via the web service cluster.

In some embodiments, the computing system may determine, using a scripting engine, whether one or more scripts should be generated or updated for the first alert, in some cases, based at least in part on one or more first alert profiles associated with the first alert, the one or more scripts corresponding to rules for processing or handling the first alert. Based on a determination that one or more scripts should be generated, the computing system, using the scripting engine, may generate the one or more scripts, and may tag the first alert with the generated one or more scripts. Based on a determination that one or more scripts should be updated, the computing system, using the scripting engine, may update the one or more scripts, and may tag the first alert with the updated one or more scripts.

These and other functions of the system 100 (and its components) are described in greater detail below with respect to FIGS. 3 and 4.

Figure 3A:
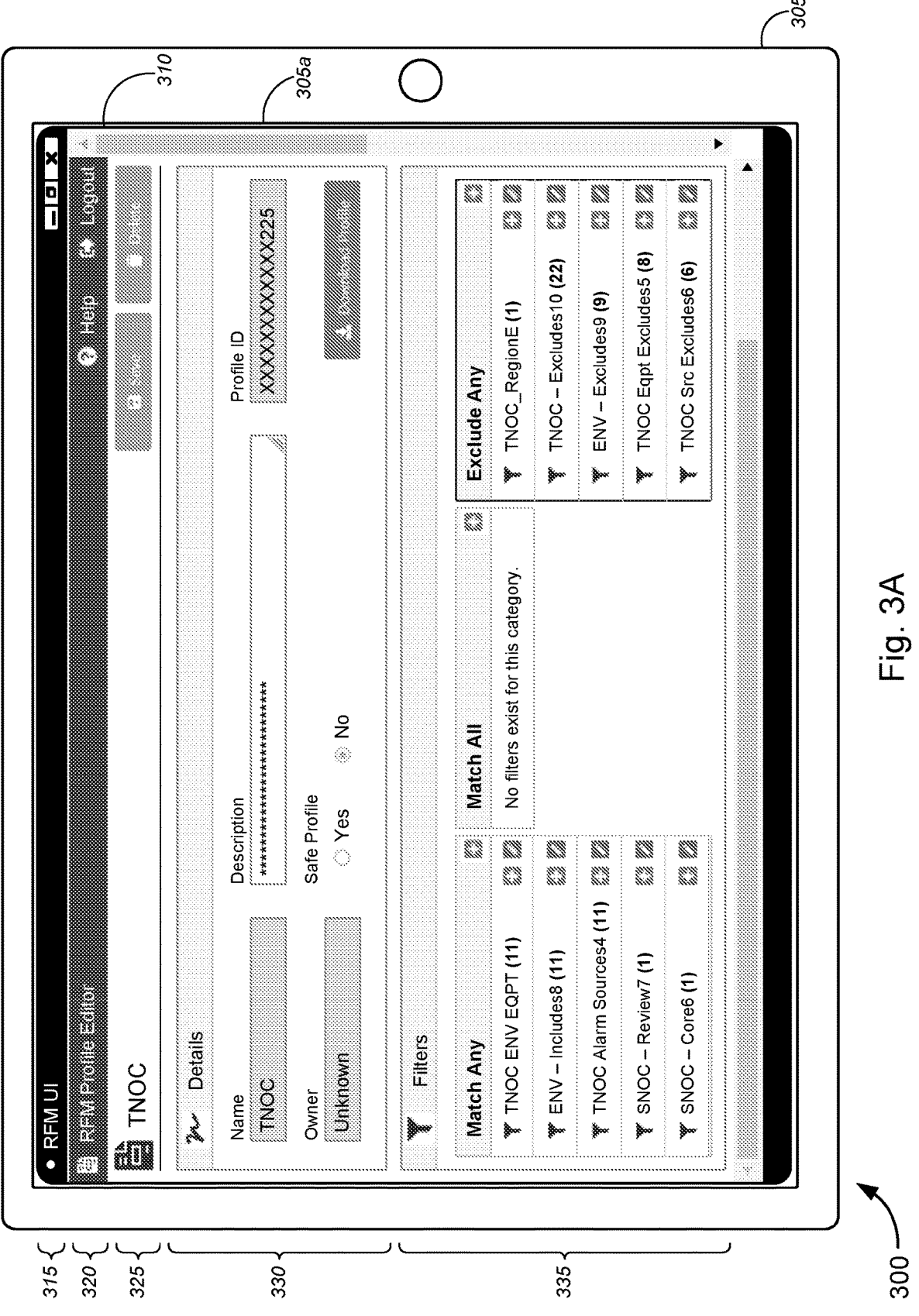
FIGS. 3A and 3B are schematic diagrams illustrating a non-limiting example of a RFM UI that may be used when implementing RFM, in accordance with various embodiments.
Figure 3B:
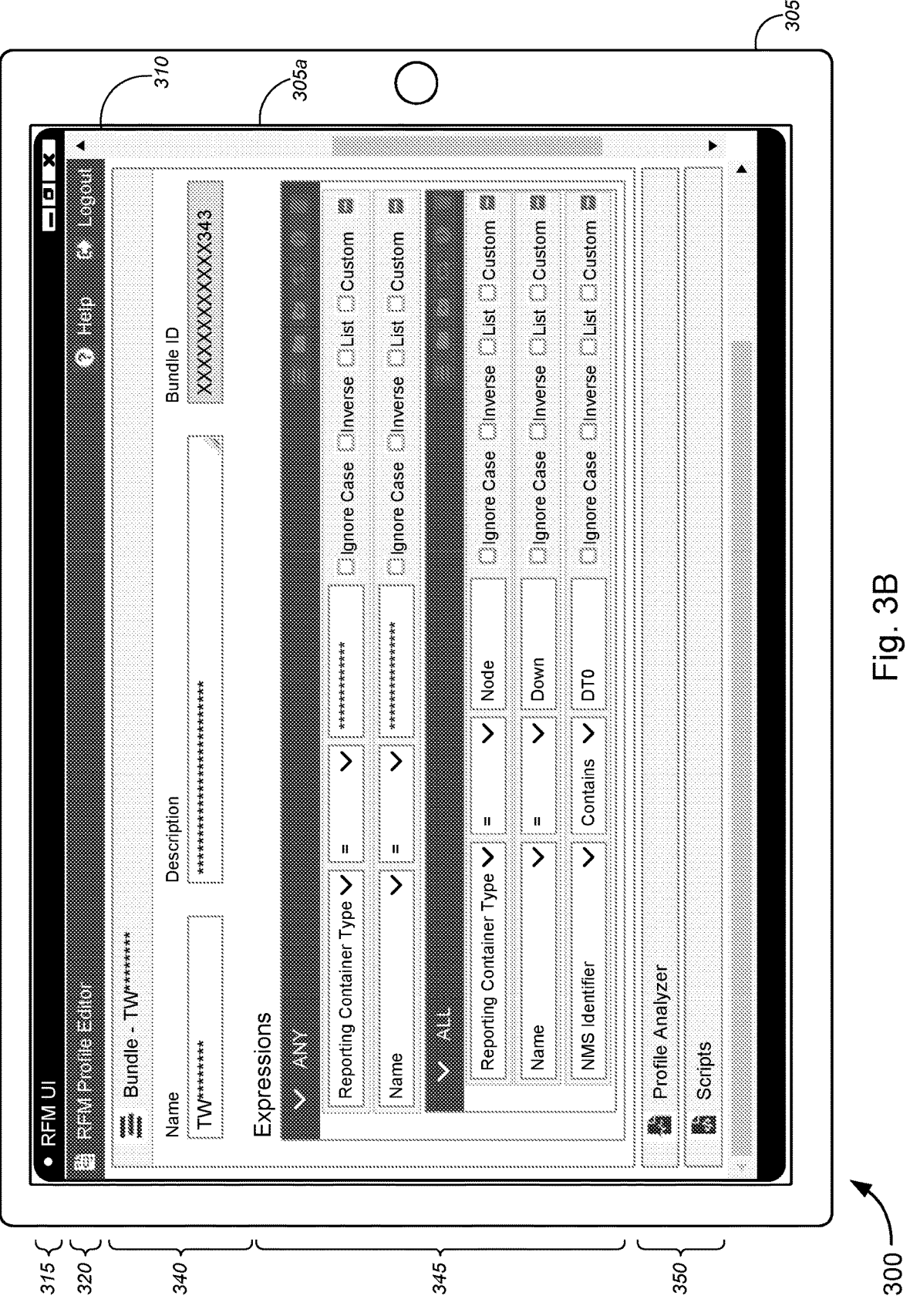

FIGS. 3A and 3B (collectively, "FIG. 3") are schematic diagrams illustrating a non-limiting example 310 of a RFM UI that may be used when implementing RFM, in accordance with various embodiments.

The embodiment as represented in FIG. 3 is merely illustrative and is not intended to limit the scope of the various embodiments. For example, although a tablet computer is shown as the user device 300, any suitable user device—including, but not limited to, user device(s) 190, which may each include, but is limited to, one of a desktop computer, a laptop computer, a tablet computer, a smart phone, a mobile phone, a NOC computing system or console, or any suitable device capable of communicating with computing system 105 (or with RFM UI 185) via a web-based portal, an API, a server, an app, or any other suitable communications interface, or the like, over network(s) 195, and the like—may be used.

As shown in the embodiment of FIG. 3, user device 300 may comprise a device housing 305 and a display 305a (which may be a touchscreen display or a non-touchscreen display). An app, an application window, program window or portal (e.g., web portal or the like) may be displayed on the display 305a. In the non-limiting example of FIG. 3, the app or portal 310 running on the user device 300 is a user interface illustrating a RFM UI (in some cases, including "RFM UI" or the like), although the various embodiments are not limited to such an app or portal, as described herein, and can be any suitable app or portal. The app or portal 310 displayed in display 305a may provide a user (e.g., a technician, a telephone agent, a web-based agent, a chat agent, or other representative, etc. of the service provider, and/or the user as described above with respect to FIG. 1, or the like) with the ability, functionality, or options to filter alerts based on one or more selected criteria, to manage preferences for displaying alerts, to modify one or more alert profiles for one or more alerts, to adjust thresholds for tracking multiple related transient alerts, or to search a search engine database, and/or the like, or any suitable functionality of the RFM UI (such as described herein in detail with respect to FIGS. 1 and 4, or the like). Herein, FIGS. 3A and 3B are directed to options associated with a RFM profile editor, for example, although not limited to such.

As shown in the non-limiting example of FIG. 3A, the app or portal 310 may include, without limitation, at least one of a header portion 315 (e.g., indicating the app or portal site as "RFM UI" or the like), a title portion 320 (e.g., indicating the functionality(ies) being offered by the RFM UI, in this case, "RFM Profile Editor" or the like), a profile title portion 325 (including profile name, "TNOC," and one or more virtual buttons or options (e.g., for saving or deleting the profile, or the like)), a details portion 330 [including, but not limited to, at least one of one or more entry fields (including for entering at least one of profile name (e.g., "TNOC" or the like), description of profile, profile ID, or owner of profile, and/or the like), one or more radio buttons or other selectable fields (including for selecting between "Yes" and "No" for whether or not the profile is safe, etc.), or one or more virtual buttons or options (e.g., for downloading the profile, or the like), and/or the like], or a filters portion 335 (including sub-sections listing results for "Match Any" filters, "Match All" filters, and/or "Exclude Any" filters, or the like), and/or the like.

As shown in the non-limiting example of FIG. 3B, the app or portal 310 may further include, without limitation, at least one of a bundle fields portion 340 (including, but not limited to, one or more entry fields for entering name of bundle, description of bundle, or bundle ID, and/or the like), an expressions portion 345 (including filter fields for filtering expressions, whether any or all are found, with options to ignore case, filter inverse, list, or customize, etc.), or other portions 350 (including, but not limited to, portions for providing options and fields for a profile analyzer, portions for providing options and fields for scripts, and/or the like), and/or the like.

Herein, "X" and "*" in FIG. 3 represents redacted information, for the purposes of simplicity of illustration in this patent document, but would be visible to a user during regular use of the RFM UI (unless otherwise indicated).

Figure 4A:
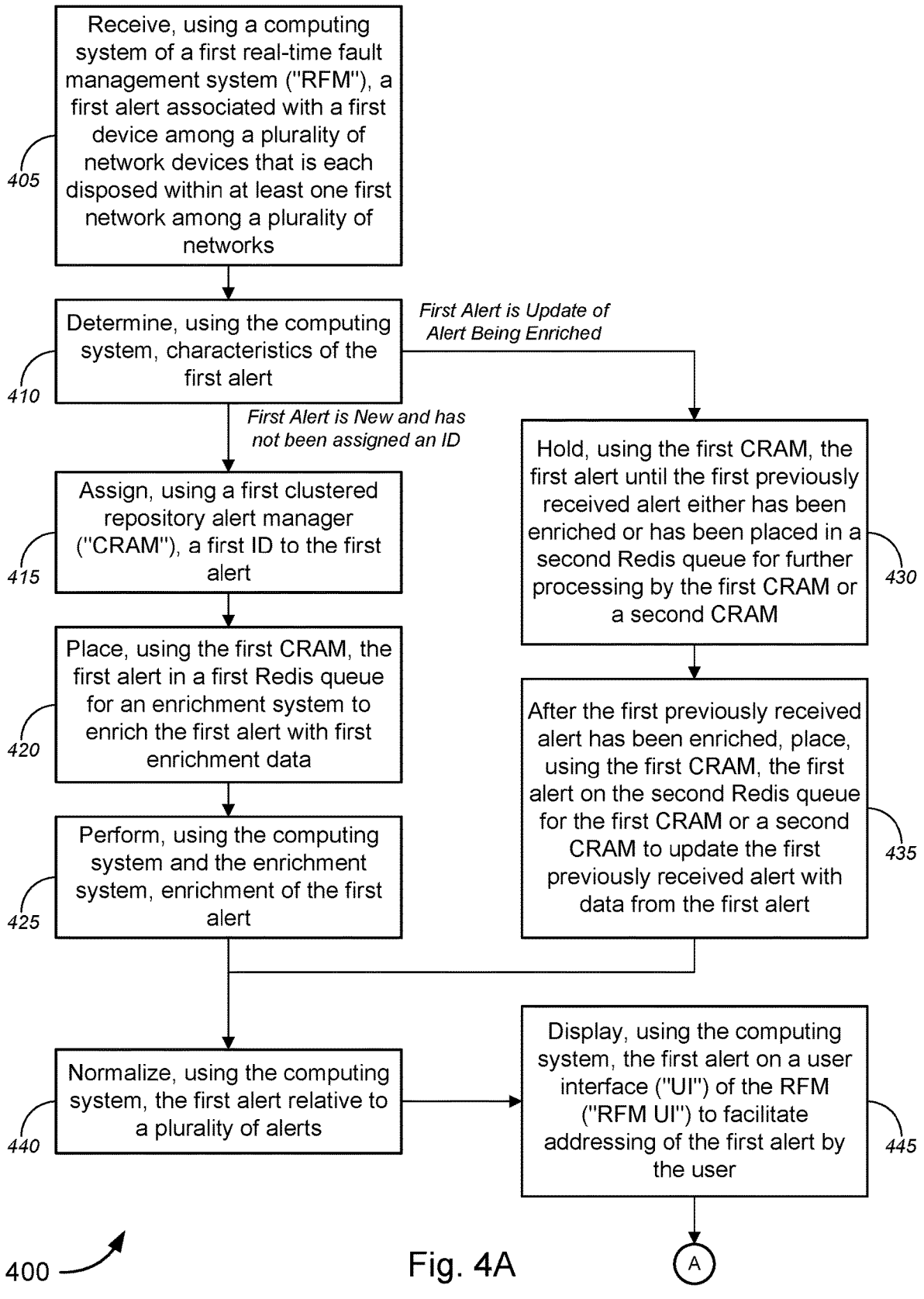
FIGS. 4A-4C are flow diagrams illustrating a method for implementing RFM, in accordance with various embodiments.
Figure 4B:
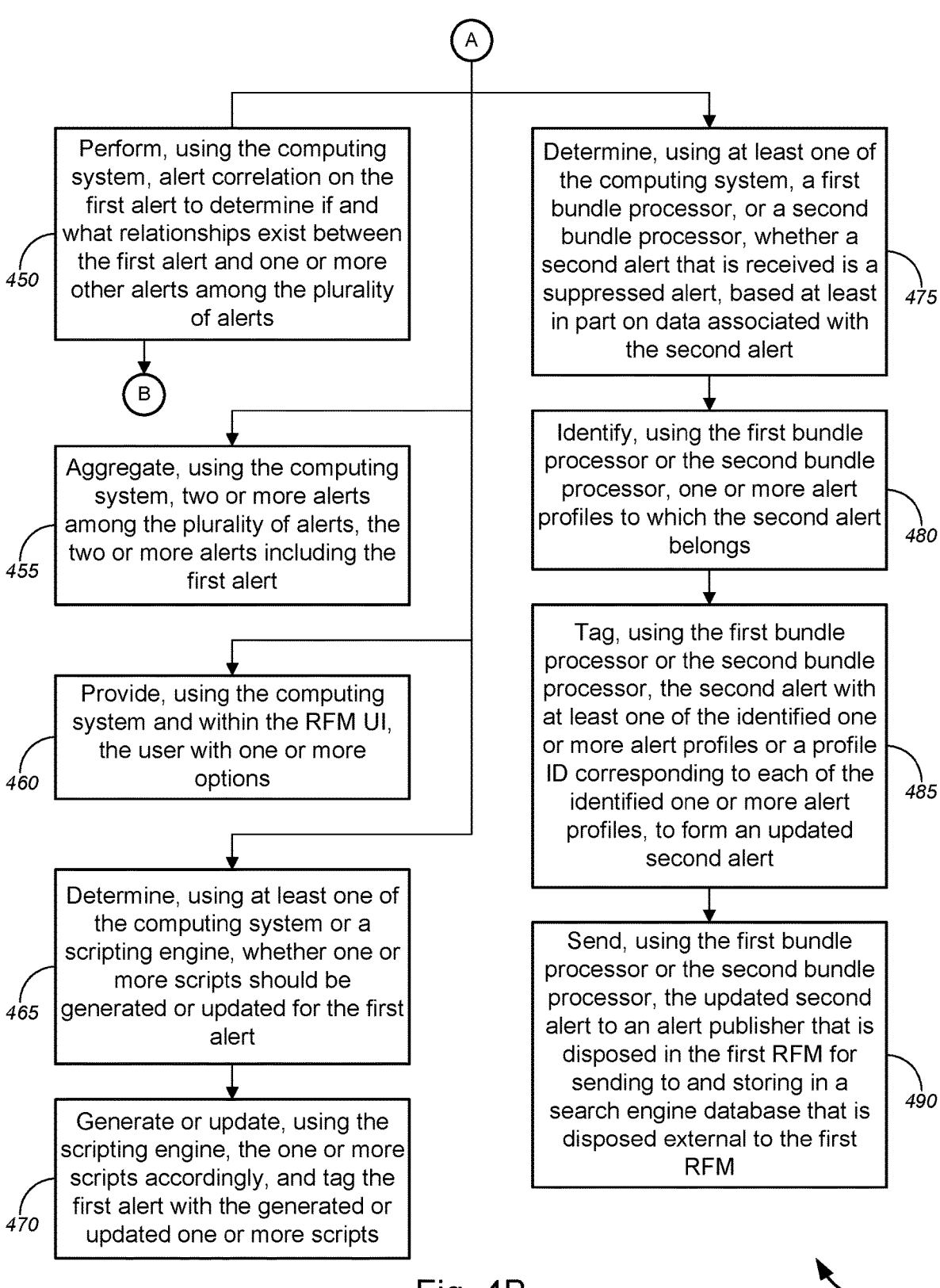
Figure 4C:
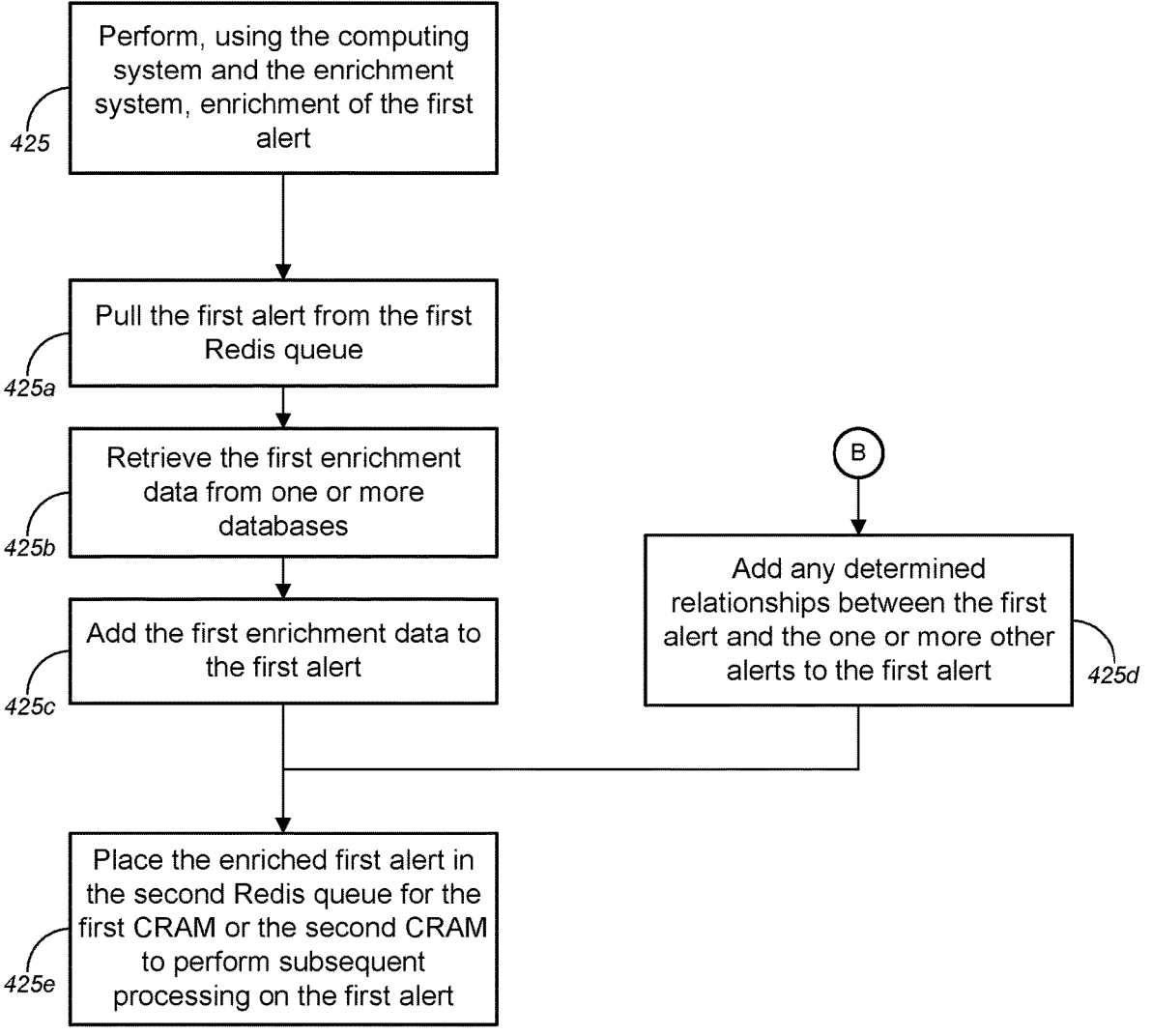

FIGS. 4A-4C (collectively, "FIG. 4") are flow diagrams illustrating a method 400 for implementing RFM, in accordance with various embodiments. Method 400 of FIG. 4A continues onto FIG. 4B following the circular marker denoted, "A," and continues from FIG. 4B to FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 310 of FIGS. 1, 2, and 3, respectively (or components thereof), such methods may also be implemented using any suitable hardware (or software) implementation. Similarly, while each of the systems, examples, or embodiments 100, 200, and 310 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 310 of FIGS. 1, 2, and 3 can each also operate according to other modes of operation and/or perform other suitable procedures.

In the non-limiting embodiment of FIG. 4A, method 400, at block 405, may comprise receiving, using a computing system of a first real-time fault management system ("RFM"), a first alert associated with a first device among a plurality of network devices that is each disposed within at least one first network among a plurality of networks.

At block 410, method 400 may comprise determining, using the computing system, characteristics of the first alert. The computing system may perform different tasks in response to different characteristics. For example, but not limited the following examples, based on a determination that the first alert is a new alert associated with the first device and has not yet been assigned an ID comprising an alert ID and a source ID, method 400 may comprise: assigning, using a first clustered repository alert manager ("CRAM"), a first ID to the first alert (block 415), the first ID including a combination of a first alert ID and a first source ID, wherein the first alert ID identifies the first alert and the first source ID identifies a source of the first alert based on device type of the source; placing, using the first CRAM, the first alert in a first remote dictionary server ("Redis") queue for an enrichment system of the first RFM to enrich the first alert with first enrichment data (block 420); and performing, using the computing system and the enrichment system, enrichment of the first alert (block 425). Method 400 may then proceed to the process at block 440.

Alternatively, or additionally, based on a determination that the first alert is not a new alert associated with the first device and is an updated alert of a first previously received alert that is associated with the first device, and based on a determination that the first previously received alert is either in the first Redis queue ready for enrichment by the enrichment system or being enriched by the enrichment system, method 400 may comprise: holding, using the first CRAM, the first alert until the first previously received alert either has been enriched or has been placed in a second Redis queue for further processing by the first CRAM or a second CRAM (block 430); and after the first previously received alert has been enriched, placing, using the first CRAM, the first alert on the second Redis queue for the first CRAM or the second CRAM to update the first previously received alert with data from the first alert (block 435). Method 400 may then proceed to the process at block 440.

At block 440, method 400 may comprise normalizing, using the computing system, the first alert relative to a plurality of alerts. In some cases, the first RFM may be among a plurality of RFMs, and normalizing the first alert may comprise normalizing, using the computing system, the first alert relative to a plurality of alerts that are processed by the plurality of RFMs. In some instances, normalizing the first alert may further comprise conforming, using the computing system, at least one of formats and data fields of the plurality of alerts, or the like. Method 400 may further comprise, at block 445, displaying, using the computing system, the first alert on a user interface ("UI") of the RFM ("RFM UI") to facilitate addressing of the first alert by the user.

Method 400 may continue onto one or more of the process at block 450 in FIG. 4B, the process at block 455 in FIG. 4B, the process at block 460 in FIG. 4B, the process at block 465 in FIG. 4B, or the process at block 475 in FIG. 4B, each following the circular marker denoted, "A."

At block 450 in FIG. 4B (following the circular marker denoted, "A," in FIG. 4A), method 400 may comprise performing, using the computing system, alert correlation on the first alert to determine if and what relationships exist between the first alert and one or more other alerts among the plurality of alerts (e.g., the first alert is related to another alert in that one is from a parent circuit while the other from a child circuit, or each is from two circuits that are (directly or indirectly) connected or communicatively coupled together, or the like).

Method 400 may continue onto the process at block 425*d* in FIG. 4C, following the circular marker denoted, "B."

Alternatively, or additionally, at block 455 in FIG. 4B (following the circular marker denoted, "A," in FIG. 4A), method 400 may comprise aggregating, using the computing system, two or more alerts among the plurality of alerts, the two or more alerts including the first alert. In such a case, displaying the first alert on the RFM UI (at block 445) may comprise displaying the aggregated two or more alerts on the RFM UI.

Alternatively, or additionally, at block 460 in FIG. 4B (following the circular marker denoted, "A," in FIG. 4A), method 400 may comprise providing, using the computing system and within the RFM UI, the user with one or more options. In some cases, the one or more options may include, without limitation, at least one of options to filter alerts based on one or more selected criteria, options to manage preferences for displaying alerts, options to modify one or more alert profiles for one or more alerts, options to adjust thresholds for tracking multiple related transient alerts, or options to search a search engine database, and/or the like.

Alternatively, or additionally, at block 465 in FIG. 4B (following the circular marker denoted, "A," in FIG. 4A), method 400 may comprise determining, using at least one of the computing system or a scripting engine, whether one or more scripts should be generated or updated for the first alert, in some cases, based at least in part on one or more first alert profiles associated with the first alert, the one or more scripts corresponding to rules for processing or handling the first alert. Method 400, at block 470, may comprise generating or updating, using the scripting engine, the one or more scripts accordingly, and tagging the first alert with the generated or updated one or more scripts.

Alternatively, or additionally, at block 475 in FIG. 4B (following the circular marker denoted, "A," in FIG. 4A), method 400 may comprise determining, using at least one of the computing system, a first bundle processor, or a second bundle processor, whether a second alert that is received is a suppressed alert, based at least in part on data associated with the second alert, the second alert being associated with a second device among the plurality of network devices. In some cases, the data associated with the second alert may comprise at least one of device ID associated with the second device, service ID associated with a service provided via the second device to a customer, or alert ID associated with the second alert, and/or the like. Method 400 may further comprise identifying, using the first bundle processor or the second bundle processor, one or more alert profiles to which the second alert belongs (block 480); tagging, using the first bundle processor or the second bundle processor, the second alert with at least one of the identified one or more alert profiles or a profile ID corresponding to each of the identified one or more alert profiles, to form an updated second alert (block 485); and sending, using the first bundle processor or the second bundle processor, the updated second alert to an alert publisher that is disposed in the first RFM for sending to and storing in a search engine database that is disposed external to the first RFM (block 490), the alert publisher being configured to send alerts to the search engine database either one alert at a time or in batches of alerts (e.g., in batches of 1500 alerts or 5 seconds worth of alerts, or more, etc.) for storage on the search engine database.

With reference to the non-limiting example of FIG. 4C, performing enrichment of the first alert (at block 425) may comprise pulling the first alert from the first Redis queue (block 425*a*); retrieving the first enrichment data from one or more databases (block 425*b*), in some cases, based at least in part on one or more of data contained in the first alert or data contained in one or more alert profiles associated with the first alert; and adding the first enrichment data to the first alert (block 425*c*). In the case that alert correlation has been performed (at block 450), at block 425*d* (following the circular marker denoted, "B," in FIG. 4B), method 400 may comprise adding any determined relationships between the first alert and the one or more other alerts to the first alert. Method 400 may further comprise, at block 425*e*, placing the enriched first alert in the second Redis queue for the first CRAM or the second CRAM to perform subsequent processing on the first alert.

Exemplary System and Hardware Implementation

Figure 5:
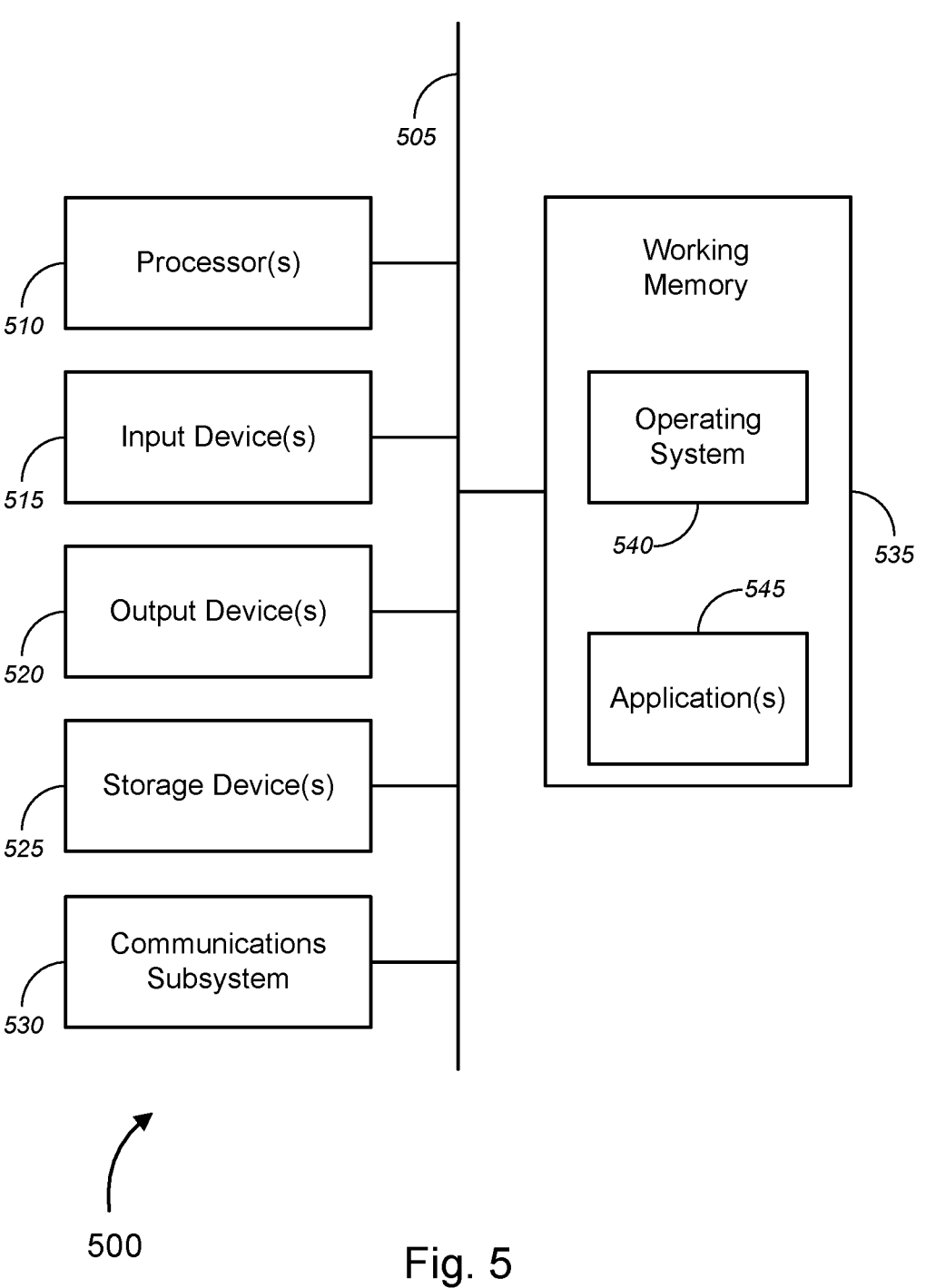
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, primary or first siloed platforms or real-time fault management systems ("RFMs") 115*a*-115*n*, secondary or second siloed platforms or RFMs 120*a*-120*n*, first and second search engine database(s) or query cache(s) 125*a* and 125*b* and/or search engine database cluster(s) 125*c*, first and second web service clusters 130*a* and 130*b*, general siloed platform 135, preprocessors 145*a*-145*n*, computing system or hivemind 150, network devices 155*a*-155*n*, global Internet Protocol management system ("GIMS") 165*a*, network management system ("NMS") server and probes 165*b*, one or more legacy NMSs 165*c*, one or more dependent systems 170*a*-170*n*, web server load balancer 180, user devices 190*a*-190*n*, NMS server 270, node broker 275, probe manager 280, probe clusters 290 and 290*a*-290*f*, and network probes 195*a*-195*n*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, primary or first siloed platforms or RFMs 115*a*-115*n*, secondary or second siloed platforms or RFMs 120*a*-120*n*, first and second search engine database(s) or query cache(s) 125*a* and 125*b* and/or search engine database cluster(s) 125*c*, first and second web service clusters 130*a* and 130*b*, general siloed platform 135, preprocessors 145*a*-145*n*, computing system or hivemind 150, network devices 155*a*-155*n*, GIMS 165*a*, NMS server and probes 165*b*, one or more legacy NMSs 165*c*, one or more dependent systems 170*a*-170*n*, web server load balancer 180, user devices 190*a*-190*n*, NMS server 270, node broker 275, probe manager 280, probe clusters 290 and 290*a*-290*f*, and network probes 195*a*-195*n*, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for case of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for case of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, using a computing system of a first real-time fault management system ("RFM"), a first alert associated with a first device among a plurality of network devices; and based on a determination that the first alert is not a new alert associated with the first device and is an updated alert of a first previously received alert that is associated with the first device, and based on a determination that the first previously received alert is either in a first remote dictionary server ("Redis") queue ready for enrichment by an enrichment system of the first RFM or being enriched by the enrichment system, performing the following:

holding, using a first clustered repository alert manager ("CRAM"), the first alert until the first previously received alert either has been enriched or has been placed in a second Redis queue for further processing by a CRAM; and after the first previously received alert has been enriched, placing, using the first CRAM, the first alert on the second Redis queue for the first CRAM or a second CRAM to update the first previously received alert with data from the first alert.

2. The method of claim 1, wherein the computing system comprises at least one of a network management system server, a fault management system, the first RFM, a plurality of RFMs, a network operations center ("NOC") computing system, a server over a network, a cloud computing system, or a distributed computing system.

3. The method of claim 1, wherein the plurality of network devices disposed within a plurality of networks comprises two or more disparate networks utilizing different alert management protocols and different fault management protocols.

4. The method of claim 1, further comprising:

determining, using at least one of the computing system, the first CRAM, the second CRAM, or a first bundle processor each of the first RFM, whether the first alert is a new alert associated with the first device and whether the first alert has been assigned an identifier ("ID") comprising an alert ID and a source ID;

based on a determination that the first alert is a new alert associated with the first device and has not yet been assigned an ID comprising an alert ID and a source ID, performing the following:

assigning, using the first CRAM, a first ID to the first alert, wherein the first ID comprises a combination of a first alert ID and a first source ID, wherein the first alert ID identifies the first alert and the first source ID identifies a source of the first alert based on device type of the source; and placing, using the first CRAM, the first alert in the first Redis queue for the enrichment system to enrich the first alert with first enrichment data.

5. The method of claim 4, further comprising:

performing, using the computing system and the enrichment system, enrichment of the first alert, by:

pulling the first alert from the first Redis queue;

retrieving the first enrichment data from one or more databases, based at least in part on one or more of data contained in the first alert or data contained in one or more alert profiles associated with the first alert;

adding the first enrichment data to the first alert; and placing the enriched first alert in the second Redis queue for the first CRAM or the second CRAM to perform subsequent processing on the first alert.

6. The method of claim 5, further comprising:

performing, using the computing system, alert correlation on the first alert to determine if and what relationships exist between the first alert and one or more other alerts among the plurality of alerts;

wherein performing enrichment of the first alert further comprises adding any determined relationships between the first alert and the one or more other alerts to the first alert.

7. The method of claim 5, wherein the first enrichment data comprises at least one of circuit ID, service ID, business organization ID, customer ID, other service data associated with a service provided via the first device to a customer, other customer data corresponding to the customer associated with the service provided via the first device or associated with the first device, device data associated with the first device, or network data associated with a network in which the first device is disposed.

8. The method of claim 1, further comprising:

determining, using at least one of the computing system, a first bundle processor or a second bundle processor, whether a second alert that is received is a suppressed alert, based at least in part on data associated with the second alert, the second alert being associated with a second device among the plurality of network devices, wherein the data associated with the second alert comprises at least one of device ID associated with the second device, service ID associated with a service provided via the second device to a customer, or alert ID associated with the second alert;

identifying, using the first bundle processor or the second bundle processor, one or more alert profiles to which the second alert belongs;

tagging, using the first bundle processor or the second bundle processor, the second alert with at least one of the identified one or more alert profiles or a profile ID corresponding to each of the identified one or more alert profiles, to form an updated second alert; and sending, using the first bundle processor or the second bundle processor, the updated second alert to an alert publisher that is disposed in the first RFM for sending to and storing in a search engine database that is disposed external to the first RFM, the alert publisher being configured to send alerts to the search engine database either one alert at a time or in batches of alerts for storage on the search engine database.

9. The method of claim 1, wherein:

the first RFM is among a first plurality of RFMs disposed in a first data center, each RFM among the first plurality of RFMs comprising a siloed platform among a plurality of first siloed platforms, each RFM among the first plurality of RFMs comprising at least one of a Redis cluster containing the first and second Redis queues, the first CRAM, the second CRAM, a first bundle processor, a second bundle processor, the enrichment system, an alert publisher, a distributor, or a synchronization system;

the plurality of first siloed platforms is mirrored in a plurality of second siloed platforms that is disposed in a second data center that is geographically distant from the first data center, the plurality of second siloed platforms comprising a second plurality of RFMs, each RFM among the second plurality of RFMs comprising a mirrored copy of each of the at least one of the Redis cluster, the first CRAM, the second CRAM, a first bundle processor, a second bundle processor, the enrichment system, the alert publisher, the distributor, or the synchronization system of a corresponding RFM among the first plurality of RFMs; and the distributor balances processes across the plurality of first siloed platforms, which is mirrored in the plurality of second siloed platforms.

10. The method of claim 9, wherein the plurality of second siloed platforms is on hot standby and is configured to completely take over operations of the plurality of first siloed platforms when at least a portion of the first siloed platforms experiences at least one failure condition.

11. The method of claim 9, wherein:

at least one of the plurality of first siloed platforms or the plurality of second siloed platforms is communicatively coupled with a general siloed platform that is disposed in a location separate from each of the first data center and the second data center, wherein the general siloed platform comprises a third Redis queue, a plurality of preprocessors, and a second computing system, wherein the third Redis queue is configured to store alerts received from each of at least one of a global Internet Protocol management system ("GIMS") configured to monitor and collect alerts from layer 2 and layer 3 devices, a plurality of software-based network probes configured to monitor layer 4 devices, or one or more legacy network management systems ("NMSs"), wherein each of the plurality of preprocessors is configured to preprocess alerts retrieved from the third Redis queue and to store raw alert messages in a search engine database cluster, wherein the second computing system is configured to manage the plurality of preprocessors, to prevent more than one preprocessor from preprocessing the same alert from the third Redis queue, and to send preprocessed alerts to a siloed platform among the plurality of first siloed platforms; and wherein receiving the first alert comprises receiving the first alert from at least one of the second computing system, a preprocessor among the plurality of preprocessors, the GIMS, a software-based network probe among the plurality of software-based network probes, or a legacy NMS among the plurality of legacy NMSs.

12. The method of claim 1, wherein the first RFM is among a plurality of RFMs, wherein normalizing the first alert comprises normalizing, using the computing system, the first alert relative to a plurality of alerts that are processed by the plurality of RFMs, wherein normalizing the first alert further comprises conforming, using the computing system, at least one of formats and data fields of the plurality of alerts.

13. The method of claim 1, further comprising:

aggregating, using the computing system, two or more alerts among the plurality of alerts, the two or more alerts including the first alert, wherein displaying the first alert on the RFM UI comprises displaying the aggregated two or more alerts on the RFM UI; and providing, using the computing system and within the RFM UI, the user with at least one of options to filter alerts based on one or more selected criteria, options to manage preferences for displaying alerts, options to modify one or more alert profiles for one or more alerts, options to adjust thresholds for tracking multiple related transient alerts, or options to search a search engine database.

14. The method of claim 13, wherein, when a query is received from a user device associated with a user as part of the user selecting the options to search the search engine database, the query is routed to a web service cluster that is geographically closest to the user device, and the web service cluster routes the query to the search engine database, and the search engine database returns a response to the RFM UI via the web service cluster.

15. The method of claim 1, further comprising:

determining, using at least one of the computing system or a scripting engine, whether one or more scripts should be generated or updated for the first alert, based at least in part on one or more first alert profiles associated with the first alert, the one or more scripts corresponding to rules for processing or handling the first alert;

based on a determination that one or more scripts should be generated, generating, using the scripting engine, the one or more scripts, and tagging the first alert with the generated one or more scripts; and based on a determination that one or more scripts should be updated, updating, using the scripting engine, the one or more scripts, and tagging the first alert with the updated one or more scripts.

16. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive a first alert associated with a first device among a plurality of network devices; and based on a determination that the first alert is not a new alert associated with the first device and is an updated alert of a first previously received alert that is associated with the first device, and based on a determination that the first previously received alert is either in a first remote dictionary server ("Redis") queue ready for enrichment by an enrichment system of the RFM or being enriched by the enrichment system, perform the following:

holding, using a first clustered repository alert manager ("CRAM"), the first alert until the first previously received alert either has been enriched or has been placed in a second Redis queue for further processing by a CRAM; and after the first previously received alert has been enriched, placing, using the first CRAM, the first alert on the second Redis queue for the first CRAM or a second CRAM to update the first previously received alert with data from the first alert.

17. The system of claim 16, wherein the computing system comprises at least one of a network management system server, a fault management system, a plurality of RFMs, a first RFM among the plurality of RFMs, a network operations center ("NOC") computing system, a server over a network, a cloud computing system, or a distributed computing system.

\*  \*  \*  \*  \*